United States Patent
Speight

(10) Patent No.: US 6,246,366 B1
(45) Date of Patent: Jun. 12, 2001

(54) DIRECTION DETERMINATION IN CELLULAR MOBILE COMMUNICATIONS NETWORK

(75) Inventor: Timothy James Speight, Bristol (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/282,821

(22) Filed: Mar. 31, 1999

(30) Foreign Application Priority Data

Apr. 3, 1998 (EP) .................................................. 98302657

(51) Int. Cl.$^7$ ........................................................ G01S 3/02
(52) U.S. Cl. ............................ 342/457; 342/378; 342/383
(58) Field of Search ..................................... 342/378, 383, 342/457

(56) References Cited

U.S. PATENT DOCUMENTS 5,937,014 * 8/1999 Pelin et al. ............................. 375/340

FOREIGN PATENT DOCUMENTS

| 95305756 | 8/1995 | (EP) | ............................. H04B/7/005 |
| 96305227 | 7/1996 | (EP) | ............................. H04Q/7/30 |
| 2 640 758 | 12/1988 | (FR) | ............................. G01S/3/02 |
| PCT/FI97/ 00318 | 5/1997 | (WO) | ............................. H04Q/7/20 |

OTHER PUBLICATIONS

European Search Report, dated Sep. 11, 1998.

* cited by examiner

*Primary Examiner*—Theodore M. Blum
(74) *Attorney, Agent, or Firm*—Jimmy Goo

(57) ABSTRACT

A direction to the location of a mobile terminal from an antenna array is determined. A sequence of symbols from each antenna 2 in the array, is stored. The sequence contains a known training sequence. The sequence is space processed iteratively so as to produce the effect of the array having a major lobe in its polar diagram at a plurality of different successive directions. A set of crosscorrelation metrics is derived by calculating a crosscorrelation metric for each direction between the combined signals and the known training sequence. The ratio is calculated of the crosscorrelation metric for each direction to the power of the combined signals for that direction to produce a set of direction metrics. A direction is ascribed to the mobile terminal using the direction metrics to determine which direction is most likely.

8 Claims, 2 Drawing Sheets

FIG.2

| +60 | +55 | +50 | | | −50 | −55 | −60 |
|---|---|---|---|---|---|---|---|
| $a_{111}$ | $a_{112}$ | $a_{113}$ | | | $a_{1123}$ | $a_{1124}$ | $a_{1125}$ |
| $a_{211}$ | $a_{212}$ | $a_{213}$ | | | $a_{2123}$ | $a_{2124}$ | $a_{2125}$ |
| $a_{121}$ | $a_{122}$ | $a_{123}$ | | | $a_{1223}$ | $a_{1224}$ | $a_{1225}$ |
| $a_{221}$ | $a_{222}$ | $a_{223}$ | | | $a_{2223}$ | $a_{2224}$ | $a_{2225}$ |

←――――― 1 to 25 ―――――→

1 to 8

| $a_{181}$ | $a_{182}$ | $a_{183}$ | | | $a_{1823}$ | $a_{1824}$ | $a_{1825}$ |
|---|---|---|---|---|---|---|---|
| $a_{281}$ | $a_{282}$ | $a_{283}$ | | | $a_{2823}$ | $a_{2824}$ | $a_{2825}$ |
| $A_1$ | $A_2$ | $A_3$ | | | $A_{23}$ | $A_{24}$ | $A_{25}$ |

DIRECTION DETERMINATION IN CELLULAR MOBILE COMMUNICATIONS NETWORK

CROSS-REFERENCE TO RELATED APPLICATION

This application claims priority of European Patent Application No. 98302657.6 filed Apr. 3, 1998.

BACKGROUND OF THE INVENTION

1. Field of the Invention

This invention relates to cellular mobile communications systems.

2. Description of the Prior Art

In order to improve carrier to interference ratios on the down link in mobile communications networks, it is proposed to transmit on the down link in a beam steered at the base station towards the mobile terminal. In order to do that it is necessary to know in which direction the mobile terminal is located.

SUMMARY OF THE INVENTION

Against this background, in accordance with the invention, there is provided a method of ascribing a direction to the location of a mobile terminal from an antenna array, comprising:

storing a sequence of symbols from each antenna in the array, the stored sequence containing a known training sequence;

space processing the sequence of stored symbols iteratively so as to produce the effect of the array having a major lobe in its polar diagram at a plurality of different successive directions;

calculating a set of crosscorrelation metrics by calculating a crosscorrelation metric for each direction between the combined signals and the known training sequence;

calculating the ratio of the crosscorrelation metric for each direction to the power of the combined signals for that direction to produce a set of direction metrics;

and ascribing a direction to the mobile terminal using the direction metrics to determine which direction is most likely.

Taking the ratio of the correlation metric to the power of the received signals rejects interferers using a different training sequence but which produce a strong signal.

The power of the combined signals may conveniently be determined by calculating the mean of the distance of the combined signals from a set level.

In order to find the training sequence in the received signals, the cross correlation metric is preferably calculated by calculating intermediate cross correlation metrics starting from different positions in the combined signals; and selecting the best intermediate crosscorrelation metric for each direction.

In order a to take into account possibly different results from a plurality of successive frames, a set of direction metrics is preferably calculated for a group of successive frames in the received signals and the metrics for each direction are summed.

Preferably an intermediate decision is made ascribing a direction in accordance with the best of the summed direction metrics for each group and periodic decision is made ascribing a direction which is the average of a the directions ascribed in a predetermined number of successive intermediate decisions.

In order to avoid distortion by wild results, the average is preferably limited to directions ascribed in intermediate decisions, which lie within a predetermined range.

Further in order to avoid wild results, the change between successive directions ascribed in periodic decisions is preferably limited to a predetermined value.

BRIEF DESCRIPTION OF THE DRAWINGS

One embodiment of the invention will now be described with reference to the accompanying drawings, in which:

FIG. 2 is shows sets of cross correlation metrics $a_{xy}$ for a group of successive frames.

DETAILED DESCRIPTION OF THE INVENTION

Figure 1:
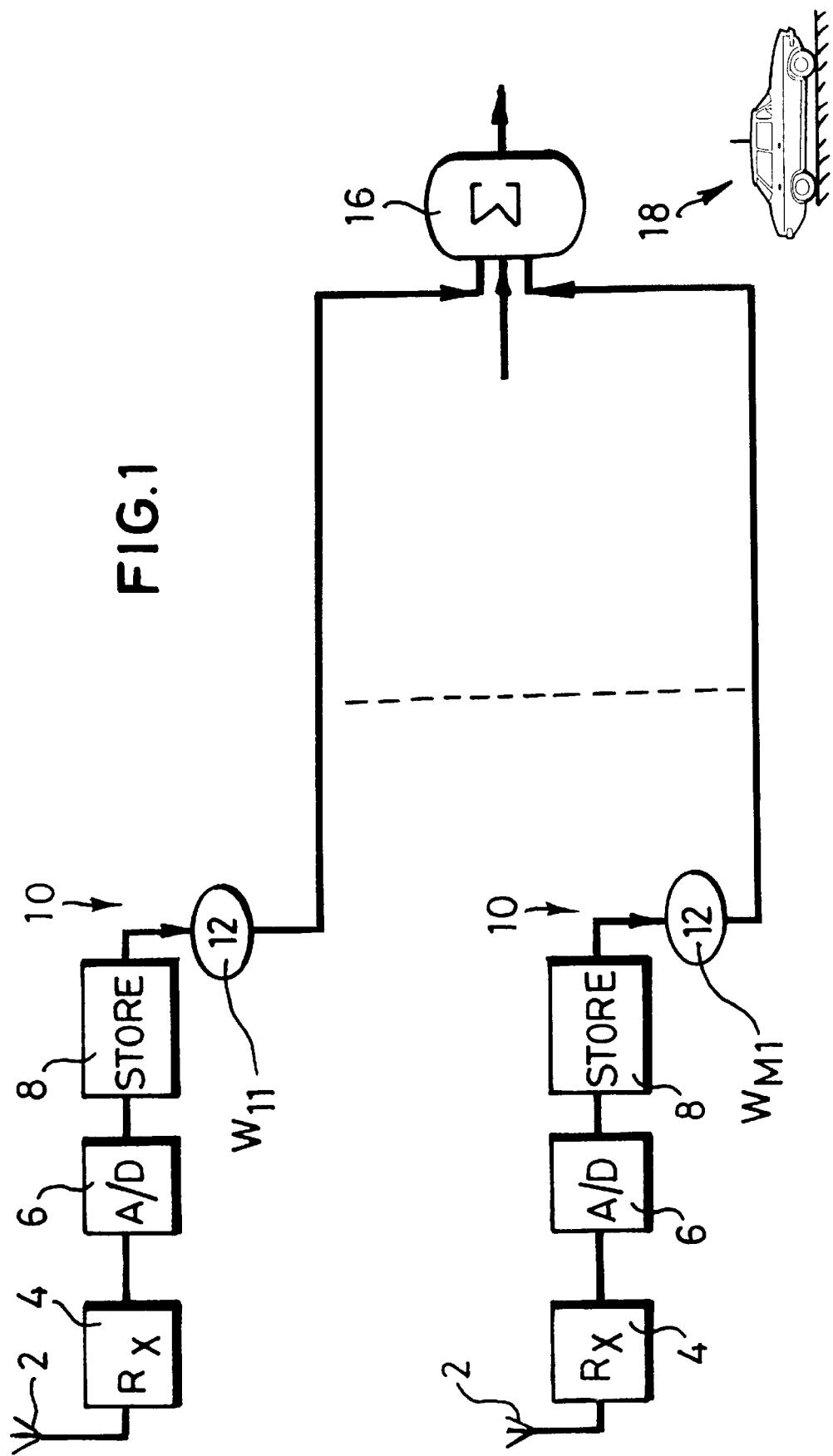
FIG. 1 is a schematic diagram of a base station antenna array and a space processor.

Referring to the drawings, the array has M antennas 2 in one polarization and M antennas in an orthogonal polarization. Each of the M antennas in each polarization is connected to a respective receiver 4. The signals received by the array are gaussian minimum shift key (GMSK) modulated. The received signals are de-rotated in the receivers 4 to remove differential phase encoding of the GMSK signals. The de-rotated signal from each receiver is fed to an analog to digital converter 6 where it is sampled and quantised, and the quantised samples are converted to coded digital signals.

The digitized de-rotated signals are stored in a store 8 from which they can be read in sequence.

An iterative process is carried out for groups i of 8 successive frames to ascribe a direction $D_i$ to the mobile terminal.

Within each iteration, the stored digitized derotated signals are iteratively space processed to produce the effect of the array having a major lobe in its polar diagram at a plurality of different successive directions.

The space processing may be achieved by weighting the signals received by each antenna and summing the weighted signals. The space processor may be physical or simulated by one or more data processors. The processing is carried out faster than real time in either case so that all the different directions are processed in one frame.

Whether the space processor is physical or virtual, in each branch 10 the signal is weighted by individual complex weights 12. The weighted signals branch signals are summed in a summer 16. The weights are to have equal magnitude but differing phases so as to scan the major lobe through 120° from −60° to +60°.

In each frame of the signals transmitted by a mobile terminal 18, there is a midamble comprising a known training sequence of 26 symbols. There is a plurality of different training sequences and the mobile terminal is instructed by the base station which sequence to send. The training sequence is not re-used by mobile terminal which might interfere with the terminal 18, so that they can be distinguished.

In one example, there are 4 antennas in one polarization and 4 antennas in an orthogonal polarization. In each direction and separately for each polarization, a crosscorrelation is performed on the summed signal output from summer 16 and the known training sequence to derive an intermediate cross correlation metric. The crosscorrelation is performed for a group of 5 symbols 11 times iteratively, sliding the known training sequence by one symbol relative to the group of 5 signals read from the store between successive iterations. The highest value intermediate crosscorrelation metric is selected and a direction metric a is calculated for each direction $$a_{pxy} = \frac{\text{maximum sliding correlator}}{\text{power of received signal}}$$

where p (1 to 2) represents the polarization, y (1 to 25) represents the direction and x (1 to 8) represents the set of metrics for that frame.

The power of the received signal may conveniently be calculated by taking the sum of the distance of the received signal from a set level of zero.

The direction metric is calculated for a group i of 8 successive frames. The metrics for one group of frames are shown in FIG. 2. The metrics for each direction are summed over the 8 frames in the group.

The direction metrics for each direction are summed $$A_y = \sum_{p=1}^{p=2} \sum_{x=1}^{x=8} a_{pxy}$$

The direction $D_i$ having the highest value of summed direction metrics $A_y$ is chosen for the group i.

The process is repeated 13 times, i=1 to 13, covering a total of 104 frames.

$$\text{The average } D_{av} = \sum_{i=1}^{i=13} D_i / 13$$

is calculated and the mobile terminal is ascribed the average direction $D_{av}$.

In calculating the average $D_{av}$ obviously wild values of $D_i$ may be discarded. Thus, for example, an intermediate average may be calculated, directions $D_i$ lying more than a predetermined distance from the average may be discarded and the average may be recalculated from the remaining values of $D_i$.

Since the mobile terminal is able to move around, the direction is recalculated every 104 frames. In order to provide further protection from wild results, the change from one ascribed direction to the next may be limited to a maximum value.

Having ascribed a direction to the mobile terminal, the antenna array can be steered to produce a major lobe in the polar diagram for downlink signals in the direction of the mobile terminal, thus reducing potential interference in other directions.

What is claimed is:

1. A method of ascribing a direction to the location of a mobile terminal from an antenna array, comprising the steps of:

storing a sequence of symbols from each antenna in the array, the stored sequence containing a known training sequence;

space processing the sequence of stored symbols iteratively so as to produce the effect of the array having a major lobe in its polar diagram at a plurality of different successive directions;

calculating a set of crosscorrelation metrics by calculating a crosscorrelation metric for each direction between combined signals and the known training sequence;

calculating the ratio of the crosscorrelation metric for each direction to the power of the combined signals for that direction to produce a set of direction metrics; and ascribing a direction to the mobile terminal using the direction metrics to determine which direction is most likely.

2. A method as claimed in claim 1, wherein the power of the combined signals is determined by calculating the mean of a distance of the combined signals from a set level of zero.

3. A method as claimed in claim 1, wherein the cross correlation metric is calculated by calculating intermediate cross correlation metrics starting from different positions in the combined signals; and selecting the best intermediate crosscorrelation metric for each direction.

4. A method as claimed in claim 1, wherein a set of direction metrics is calculated for a group of successive frames in the received signals and the metrics for each direction are summed.

5. A method as claimed in claim 4 wherein an intermediate decision is made ascribing a direction in accordance with a highest value of the summed direction metrics for each group and periodic decision is made ascribing a direction which is the average of a the directions ascribed in a predetermined number of successive intermediate decisions.

6. A method as claimed in claim 5, wherein the average is limited to directions ascribed in intermediate decisions, which lie within a predetermined range.

7. A method as claimed in claim 5, wherein a change between successive directions ascribed in periodic decisions is limited to a predetermined value.

8. A method as claimed in claim 5, wherein the antenna array contains antennas oriented in two different polarizations.

\* \* \* \* \*